United States Patent Office 3,071,511
Patented Jan. 1, 1963

3,071,511
PREDNISOLONE-21-OENANTHATE OCTYLDO-
DECANOL EYE LOTION
Kanzo Sasaki, Osaka, and Junko Morita, Nagata-ku, Kobe, Japan, assignors to Shionogi & Co., Ltd., Osaka-shi, Japan
No Drawing. Filed Aug. 10, 1959, Ser. No. 832,500
3 Claims. (Cl. 167—59)

This invention relates to a novel derivative of prednisolone, particularly to an oil-soluble prednisolone derivative suitable for an ophthalmologic use.

Although it is well known that prednisolone is a very useful medicine not only for internal or dermatological purpose, but for ophthalmologic treatment, there is scarcely any efficacious eye-lotion of prednisolone, because prednisolone is almost insoluble in water. Prednisolone acetate has been used as a water-soluble derivative of prednisolone hitherto, but the solubility of prednisolone acetate is not satisfactory for preparing the efficacious eye-lotion.

Accordingly, it is an object of the present invention to provide a novel prednisolone derivative suitable for an ophthalmologic use, especially for an eye-lotion.

A novel compound of the present invention may be indicated by the following structural formula:

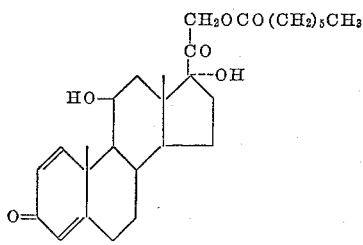

This compound, prednisolone-21-oenanthate, quantitatively prepared by the method hereafter more particularly described.

Prednisolone-21-oenanthate is easily obtained by reacting prednisolone with oenanthic anhydride in a suitable organic solvent under ice-cooling.

Without cooling this reaction can proceed, too, but in this case the objective compound obtained is contaminated by colored impurities. The stained product of this sort is obviously unsuitable for the particular use, such as the eye-lotion.

Though it is not impossible to refine it by recrystallizations, these procedures are undesirable as they are inclined to decrease the yield of this reaction extremely.

When the reaction is carried out under ice-cooling, it has enormous advantages in not only that the contamination of the product can be avoided, but also that it affords the product in excellent yield almost quantitatively.

As the solvent for this invention all inert organic solvents which can be used in the usual organic synthesis, may be employed equally. Generally stated, ether, benzene, or pyridine may be exemplified.

The compound of the present invention, prednisolone-21-oenanthate, has an outstanding solubility to the usual vegetable oil. And the anti-inflammatory activity of prednisolone is not decreased in the slightest degree by esterification to oenanthate.

With a view to dissolving necessary quantity for an ophthalmologic treatment, employment of castor-oil or "Eutanol" (manufactured by Dehydag in Germany), a liquid, saturated fatty alcohol consisting essentially of octyldodecanol, as a base of the eye-lotion is to be desired.

0.35 g. of prednisolone-21-oenanthate is soluble in 100 cc. of castor-oil or "Eutanol."

So the compound of the present invention is a very useful oil-soluble derivative of prednisolone for medical purpose, especially for preparing an efficacious anti-inflammatory eye-lotion.

The following example will illustrate the manner in the synthesizing procedure in further detail.

*Example*

1 g. of prednisolone and 1 g. of oenanthic anhydride were dissolved in 2 cc. of pyridine and allowed to stand for 40 hrs. under cooling (about at $-13°$ C.), and the mixture was poured onto ice-water. After 1 hr. the crude crystals were precipitated. Then the mixture was made alkaline with sodium carbonate solution, and precipitated crystals were collected by filtration, washed with dilute hydrochloric acid and water by turns, and dried. Recrystallizing from ethanol, there were yielded 1.32 g. of prednisolone-21-oenanthate, M.P. 187.5–188.5° C.

*Analysis.*—Calcd. for $C_{28}H_{40}O_6$: C, 71.16; H, 8.53. Found: C, 71.20; H, 8.69.

Having thus described our invention, we claim:
1. An anti-inflammatory eye-lotion consisting essentially of a solution of prednisolone-21-oenanthate in liquid, saturated fatty alcohol consisting essentially of octyldodecanol.
2. The eye-lotion described in claim 1, wherein said solution contains about 0.35 g. of prednisolone-21-oenanthate per 100 cc. of said alcohol.
3. A method for combatting eye inflammation by treating the eye with a solution of prednisolone-21-oenanthate in liquid, saturated fatty alcohol consisting essentially of octyldodecanol.

References Cited in the file of this patent
UNITED STATES PATENTS

| | | |
|---|---|---|
| 2,445,366 | Rigby | July 20, 1948 |
| 2,783,226 | Gould et al. | Feb. 26, 1957 |
| 2,837,464 | Nobile | June 3, 1958 |
| 2,848,465 | Fried | Aug. 19, 1958 |
| 2,864,837 | Sebek et al. | Dec. 16, 1958 |
| 2,880,130 | Johnson | Mar. 31, 1959 |
| 2,880,138 | Johnson | Mar. 31, 1959 |
| 2,898,269 | Felletschin | Aug. 4, 1959 |
| 2,983,649 | Ercoli | May 9, 1961 |

OTHER REFERENCES

Lippmann: A.M.A. Archives of Ophthalmology, vol. 57, March 1957, pp. 339–344.

De Navarre: "International Encyclopedia of Cosmetic Material Trade Names," page 108, entry "Eutanol-F," 1957.

"Naunyn-Schmiedebergs Arch. exptl. Pathol. Pharmakol.," vol. 223 (1954), article by Junkmann, pp. 280, 284, 223–224.